US012437950B2

(12) United States Patent
Schaich et al.

(10) Patent No.: US 12,437,950 B2

(45) Date of Patent: Oct. 7, 2025

(54) PLUG-IN SUMMATION CURRENT TRANSFORMER MODULE, RAIL-MOUNTED DEVICE, AND ASSEMBLY METHOD

(71) Applicant: Siemens Aktiengesellschaft, Munich (DE)

(72) Inventors: Sebastian Schaich, Regensburg (DE); Tobias Keimel, Regensburg (DE); Michael Koch, Freudenberg (DE)

(73) Assignee: Siemens Aktiengesellschaft, Munich (DE)

( * ) Notice: Subject to any disclaimer, the term of this patent is extended or adjusted under 35 U.S.C. 154(b) by 256 days.

(21) Appl. No.: 18/361,229

(22) Filed: Jul. 28, 2023

(65) Prior Publication Data

US 2024/0038474 A1 Feb. 1, 2024

(30) Foreign Application Priority Data

Jul. 28, 2022 (DE) ..................... 10 2022 207 779.2

(51) Int. Cl.

*H01H 83/22* (2006.01)
*H01H 71/02* (2006.01)

(Continued)

(52) U.S. Cl.

CPC ...... *H01H 83/226* (2013.01); *H01H 71/0207* (2013.01); *H01H 71/08* (2013.01); *H01H 71/12* (2013.01)

(58) Field of Classification Search

CPC ............. H01H 83/226; H01H 71/0207; H01H 71/08; H01H 71/12; H01H 71/082; H01H 71/125; H01H 83/144; H01H 9/02; H01H 11/00; H02M 7/003; G01R 15/18; G01R 1/0408; H01F 27/28; H01F 27/2828; H01F 27/29; H01F 27/306; H01F 38/30

See application file for complete search history.

(56) References Cited

U.S. PATENT DOCUMENTS

| | | | | |
|---|---|---|---|---|
| 3,786,381 | A | 1/1974 | Schmitt et al. | |
| 7,268,651 | B2 | 9/2007 | Eckert et al. | |
| 7,986,202 | B2 * | 7/2011 | Woodson ............ | H01H 83/144 336/197 |

FOREIGN PATENT DOCUMENTS

| | | |
|---|---|---|
| CN | 101335165 A | 12/2008 |
| DE | 7105414 U | 5/1971 |

(Continued)

*Primary Examiner* — Mohamad A Musleh

(74) *Attorney, Agent, or Firm* — Laurence A. Greenberg; Werner H. Stemer; Ralph E. Locher

(57) ABSTRACT

A plug-in summation current transformer module for insertion into a module-overlapping installation space of a multipole rail-mounted device that is formed of a plurality of housing modules has a summation current transformer and primary conductors routed through the tubular summation current transformer. The primary conductors have primary conductor ends. A primary conductor holder for fixing the primary conductor ends is fastened to the summation current transformer and adopts a fixing position for holding the primary conductor ends in an assembling position for insertion into a module-overlapping installation space and a releasing position where the primary conductor ends move transversely into a releasing position allowing the primary conductor ends to join into their contacts in the modules.

9 Claims, 7 Drawing Sheets

(51) Int. Cl.
*H01H 71/08* (2006.01)
*H01H 71/12* (2006.01)

(56) References Cited

FOREIGN PATENT DOCUMENTS

| | | | | | |
|---|---|---|---|---|---|
| DE | 102004034859 | A1 | | 2/2006 | |
| DE | 102013211539 | A1 | | 3/2014 | |
| DE | 102015205632 | A1 | | 9/2016 | |
| DE | 102015213375 | A1 | | 1/2017 | |
| DE | 102015217704 | A1 | | 3/2017 | |
| DE | 102021208514 | A1 | * | 2/2023 | ............. H01F 27/06 |
| DE | 102021208516 | A1 | | 2/2023 | |
| EP | 1473750 | A1 | | 11/2004 | |
| EP | 1191562 | B1 | | 11/2007 | |
| EP | 2031627 | A2 | | 3/2009 | |
| EP | 2980822 | A1 | | 2/2016 | |
| EP | 2685482 | B1 | | 5/2017 | |
| EP | 3525227 | A1 | | 8/2019 | |
| TW | 392185 | B | * | 6/2000 | |

* cited by examiner

PLUG-IN SUMMATION CURRENT TRANSFORMER MODULE, RAIL-MOUNTED DEVICE, AND ASSEMBLY METHOD

CROSS-REFERENCE TO RELATED APPLICATION

This application claims the priority, under 35 U.S.C. § 119, of German Patent Application DE 10 2022 207 779.2, filed Jul. 28, 2022; the prior application is herewith incorporated by reference in its entirety.

FIELD AND BACKGROUND OF THE INVENTION

The invention relates to a plug-in summation current transformer module for insertion into a module-overlapping installation space of an insulating-material housing, formed from a plurality of housing modules, of a multi-pole rail-mounted device, having a tubular summation current transformer as well as at least one first and one second primary conductor, which are in each case routed at least once through the tubular summation current transformer and have in each case one first and one second primary conductor end. The invention furthermore relates to a multi-pole rail-mounted device of modular construction having a plug-in summation current transformer module of this type, as well as to a method for assembling a plug-in summation current transformer module of this type in a module-overlapping installation space of a multi-pole insulating-material housing of modular construction of a multi-pole rail-mounted device of modular construction of this type.

Electromechanical protective switching devices—for example circuit breakers, line circuit breakers, fault current circuit breakers, and arc fault detection devices—serve to monitor and protect an electrical circuit and are used in particular as switching and safety elements in electrical energy supply and distribution networks. To monitor and protect the electrical circuit, the protective switching device is electrically conductively connected via two or more connection terminals to an electrical line of the circuit to be monitored, in order to interrupt the electric current in the respective monitored line if necessary. To this end, the protective switching device has at least one switching contact, which can be opened if a predefined state occurs—for example if a short circuit or a fault current is detected—in order to separate the monitored circuit from the electrical supply network. Such protective switching devices are also known as rail-mounted devices in the field of low-voltage technology.

Circuit breakers are specifically designed for high currents. A line circuit breaker, which is also referred to as a “miniature circuit breaker” (MCB), represents a so-called overcurrent protection device in electrical installation and is used in particular in the field of low-voltage networks. Circuit breakers and line circuit breakers ensure reliable deactivation in the event of a short circuit and protect consumers and systems from overload, for example from damage to the electrical lines by excessive heating as a result of too high an electric current. They are designed to automatically deactivate a circuit to be monitored in the event of a short circuit or if an overload occurs and thus to separate it from the rest of the supply network. Circuit breakers and line circuit breakers are therefore used in particular as switching and safety elements for monitoring and protecting an electrical circuit in electrical energy supply networks. Line circuit breakers are already known in principle from German and European patent applications DE 10 2015 217 704 A1, EP 2 980 822 A1, DE 10 2015 213 375 A1, DE 10 2013 211 539 A1, and from European patent EP 2 685 482 B1.

To interrupt a single phase line, use is generally made of a single-pole line circuit breaker which usually has a width of one subdivision unit (corresponding to about 18 mm). For three-phase connections, use is made (as an alternative to three single-pole switching devices) of three-pole line circuit breakers, which accordingly have a width of three subdivision units (corresponding to about 54 mm). Each of the three phase conductors is in this case assigned a pole, i.e., a switching position. If, in addition to the three phase conductors, the neutral conductor is also intended to be interrupted, reference is made to four-pole devices, which have four switching positions, namely, three for the three phase conductors and one for the common neutral conductor.

In addition, there are compact line circuit breakers, which, with a housing width of only one subdivision unit, provide two switching contacts for one connection line each, i.e., either for two phase lines (compact line circuit breaker of type 1+1) or for a phase line and the neutral conductor (compact line circuit breaker of type 1+N). Such compact protective switching devices of narrow design are already known in principle for example from the documents DE 10 2004 034 859 A1, EP 1 191 562 B1 or EP 1 473 750 A1.

A fault current circuit breaker is a protective device for ensuring protection against a hazardous fault current in an electrical system. Such a fault current—which is also referred to as a residual current—occurs when a live line part has electrical contact to ground. This is the case for example when a person touches a live part of an electrical system: in this case, the current is dissipated to ground as a fault current through the body of the person in question. To provide protection against such body currents, the fault current circuit breaker has to separate the electrical system quickly and safely from the line network at all poles if such a fault current occurs. In common parlance, instead of the term “fault current circuit breaker,” the terms fault current protective device (abbr. FI switch), differential current protection switch (abbr. DI switch), or RCD (for “residual current protective device”) are also used equivalently.

In fault current circuit breakers, a distinction is also made between network-voltage-dependent and network-voltage-independent device types: while network-voltage-dependent fault current circuit breakers have control electronics with a tripping device, which are dependent on an auxiliary or network voltage to fulfil their function, network-voltage-independent fault current circuit breakers do not require an auxiliary or network voltage to realize the tripping function but generally have a somewhat larger summation current transformer to realize the network-voltage-independent tripping, with the result that a larger induction current can be generated in the secondary winding.

In addition, there are also device types in which the functionality of a fault current circuit breaker is combined with the functionality of a line circuit breaker: such combined protective switching devices are referred to as RCBOs (residual current operated circuit breaker with overcurrent protection). Compared with separate fault current circuit breakers and line circuit breakers, these combined devices have the advantage that each circuit has its own fault current circuit breaker: Normally, a single fault current circuit breaker is used for several circuits. If a fault current occurs, all the protected circuits are thus consequently deactivated. As a result of the use of RCBOs, only the circuit that is affected in each case is deactivated.

To detect such a fault current or residual current, the level of the current in a line leading to an electrical consumer, for example a phase line, is compared with the level of the current in a line leading back from the electrical consumer, for example a neutral conductor, with the aid of a so-called summation current transformer. This has an annular magnetic core through which the primary conductors (feed and return electrical lines) are guided. The magnetic core itself is wound with a secondary conductor or a secondary winding. In the fault-current-free state, the sum of the electric currents flowing to the consumer is equal to the sum of the electric currents flowing back from the consumer. If the currents are added vectorially, i.e., with respect to direction and with a sign, then the signed sum of the electric currents in the feed and return lines is equal to zero in the fault-current-free state: no induction current is induced in the secondary conductor. By contrast, in the event of a fault current or residual current which is dissipated to ground, the sum detected in the summation current transformer of the feed and return electric currents is not equal to zero. The current difference that occurs in this case means that a voltage proportional to the current difference is induced at the secondary winding, with the result that a secondary current flows in the secondary winding. This secondary current serves as a fault current signal and, after a predetermined value has been exceeded, causes the protective switching device to trip and consequently—as a result of the opening of the at least one switching contact of the protective switching device—deactivation of the correspondingly protected circuit.

In particular in the case of multi-pole fault current circuit breakers, either as pure fault current circuit breakers or as a combined type of device such as RCBO, the comparatively thick primary conductors have to be manually threaded through the annular magnetic core during the assembling of the summation current transformer. Assembling of this type is comparatively complex and by default has to be carried out manually, specifically in the case of compact protective devices or measuring apparatuses which have available only limited installation space.

SUMMARY OF THE INVENTION

It is accordingly an object of the invention to provide a plug-in summation current transformer module for insertion into a module-overlapping installation space of a multi-pole rail-mounted device formed from a plurality of housing modules, a multi-pole rail-mounted device in modular form having a plug-in summation current transformer module of this type, as well as a method for assembling a plug-in summation current transformer module of this type in a rail-mounted device of this type, which overcomes a variety of disadvantages of the heretofore-known devices and methods of this general type and which is particularly distinguished by a simplified assembly.

With the above and other objects in view there is provided, in accordance with the invention, a plug-in summation current transformer module for insertion into a module-overlapping installation space of a multi-pole rail-mounted device formed from a plurality of housing modules, the current transformer module comprising:

a tubular summation current transformer;

at least one first primary conductor and at least one second primary conductor, each being routed through said tubular summation current transformer and each having a first primary conductor end and a second primary conductor end;

a primary conductor holder for fixing said first and second primary conductor ends, said primary conductor holder being fastened to said summation current transformer and being configured to adopt a fixing position and a releasing position, said primary conductor holder being configured, in the fixing position, to hold said first and second primary conductor ends in a respective assembling position during an insertion into the module-overlapping installation space; and after insertion, by moving to the releasing position, to bring said first and second primary conductor ends into a respective joining position.

In other words, the objects of the invention are achieved by a plug-in summation current transformer module, by the multi-pole rail-mounted device in modular form, as well as by the assembly method according to the claims.

The plug-in summation current transformer module according to the invention for insertion into a module-overlapping installation space of a multi-pole rail-mounted device, formed from a plurality of housing modules, has a summation current transformer as well as at least one first and one second primary conductor, which are in each case routed at least once through the tubular summation current transformer and in turn have in each case one first and one second primary conductor end. The plug-in summation current transformer module furthermore has a primary conductor holder for fixing the first and the second primary conductor ends, which is fastened to the summation current transformer and movable between a fixing position and a releasing position and is configured to, in the fixing position, hold the first and the second primary conductor ends in a respective assembling position during insertion into the module-overlapping installation space; and after insertion, by moving to the releasing position, to bring the first and the second primary conductor ends into a respective joining position.

The summation current transformer has an annular, tubular, or toroidal shape, the first and the second primary conductor being routed through the opening thereof already prior to assembling in a housing of the rail-mounted device. As opposed to assembling in a so-called "pot-and-lid" construction mode, in which the modules and components, in particular also the summation current transformer, of the rail-mounted device are inserted into a housing pot which comprises the fastening side as well as parts of the narrow and wide sides, before the housing is closed by placing on top a housing lid which comprises the front side as well as parts of the narrow and wide sides, the insertion of the plug-in summation current transformer module by way of the wide side of the otherwise completely equipped insulating-material housing represents a significant facilitation, in particular because the summation current transformer can already be wound with the primary conductors outside the housing, i.e., pre-assembled, so that the primary conductors do not have to be threaded through the summation current transformer by hand after the latter has been inserted into the housing pot. The complexity in assembling is significantly simplified as a result. Since the joining direction in a housing in the "pot-and-lid" construction mode is rotated by 90° in comparison to the so-called "shell construction mode", a modular construction cannot be implemented in the former.

The insulating-material housing of the multi-pole rail-mounted device is of modular construction, i.e., formed from a plurality of housing modules. This is to be understood to mean that the individual poles, for example of an MCB, i.e., of a circuit breaker or of an RCD, i.e., of a fault current circuit breaker, are already completely pre-assembled in a respective dedicated housing module before the plug-in summation current transformer module is assembled. The housing modules that form the rail-mounted device, for example an RCD and an MCB module for a two-pole circuit breaker device, or one RCD and three MCB modules for a four-pole circuit breaker device (each of the type FI) are subsequently mechanically connected so as to form an insulating-material housing which, with the exception of the plug-in summation current transformer module, is completely pre-populated. The individual housing modules have in each case one installation opening which is continuous from one wide side to the other and, after being connected, form a module-overlapping installation space.

When assembling the plug-in summation current transformer module it is to be ensured that the first and the second primary conductor ends are in their final position in direct proximity of the terminal contacts of the respective housing module that protrude into the installation opening of each one of the housing modules, but that said first and second primary conductor ends do not collide with these terminal contacts during insertion of the plug-in summation current transformer module. Due to the modular construction mode of the rail-mounted device, all the terminal contacts of the individual housing modules are in one plane. In order to enable a collision-free insertion into the module-overlapping installation space, the plug-in summation current transformer module has a primary conductor holder which is movable between a fixing position and a releasing position, wherein the primary conductor ends in the fixing position of the primary conductor holder assume an assembling position in which the plug-in summation current transformer module can be inserted in a collision-free manner into the module-overlapping installation space, whereas said primary conductor ends in the releasing position of the primary conductor holder assume a joining position in which each of the first and the second primary conductor ends is positioned in direct proximity of the terminal contact that is unequivocally assigned thereto, so that the primary conductor ends can be easily connected in an electrically conducting manner to their respectively assigned terminal contact by a suitable joining method. Finally, the module-overlapping installation space is closed on both sides so as to be protected against unauthorized physical contact and from environmental influences such as dust or moisture.

In one advantageous refinement of the plug-in summation current transformer module, the first and the second primary conductor ends in the assembling position are configured so as to radially project from the tubular summation current transformer.

The term “radial” means that the first and the second primary conductor ends project substantially radially from the tubular summation current transformer, i.e., under no circumstances axially or substantially axially from the latter. In this way, the plug-in summation current transformer module and the primary conductor holder can be kept compact during the insertion movement into the module-overlapping installation space, so that any collision with the terminal contacts of the rail-mounted device can be reliably avoided.

In a further advantageous refinement, the plug-in summation current transformer module has a guide contour which during insertion into the module-overlapping installation space interacts with a guide contour configured in the latter, so as to enable collision-free insertion of the plug-in summation current transformer module into the module-overlapping installation space. The assembling of the plug-in summation current transformer module is further simplified in this way.

In a further advantageous refinement of the plug-in summation current transformer module, the first and the second primary conductor ends in their assembling position are able to be fixed in relation to the inherent elasticity of the first and of the second primary conductor.

This results in the advantage that the first and the second primary conductor ends in their assembling position need only to be fixed in relation to their inherent elasticity by the primary conductor holder in the latter’s fixing position. The first and the second primary conductor ends are released by bringing the primary conductor holder into its assembling position, so that the first and the second primary conductors move into their respective joining position by virtue of the inherent elasticity of the first and of the second primary conductor. This further simplifies assembling.

In a further advantageous refinement of the plug-in summation current transformer module, the primary conductor holder has a snap-fit connection which, when released, causes a transition from the fixing position to the releasing position.

By means of the snap-fit connection, the first and the second primary conductor ends are fixed in their assembling position by the primary conductor holder in its fixing position. The primary conductor holder is moved to its releasing position by releasing the snap-fit connection, in which releasing position the first and the second primary conductor ends are no longer fixed in the respective assembling position of the latter and can move into their respective joining position—either in a guided manner by the primary conductor holder or freely by virtue of the inherent elasticity of the first and of the second primary conductor. The release of the snap-fit connection here may be initiated manually as well as in an automated manner.

In a further advantageous refinement of the plug-in summation current transformer module, at least one further primary conductor is routed through the summation current transformer.

If the plug-in summation current transformer module is provided for a three-pole or four-pole rail-mounted device in modular form, a third and optionally a fourth primary conductor is to be routed through the summation current transformer in an analogous manner. In this way, different rail-mounted devices with different numbers of poles can be formed with a significantly reduced number of modules and components. The production costs are significantly reduced by using identical parts and components.

The multi-pole rail-mounted device in modular form according to the invention has at least one first and one second housing module having in each case a front side, a fastening side which lies opposite the front side, as well as first and second narrow sides and wide sides which connect the front and the fastening side. Each housing module here has an opening running from the first to the second wide side, which openings, when connecting the at least two housing modules so as to form an insulating-material housing, form a module-overlapping installation space, wherein two terminal contacts protrude into the respective opening in each of the housing modules. Furthermore, the multi-pole rail-mounted device in modular form has a plug-in summation current transformer module of the type described above, wherein the first and the second primary conductor ends in their respective joining positions are disposed so as to be directly adjacent to their respectively assigned terminal contact.

In terms of the fundamental advantages of the rail-mounted device according to the invention having a plug-in summation current transformer module, reference is made to the preceding explanations pertaining to the plug-in summation current transformer module according to the invention.

A two-pole modular rail-mounted device, for example an earth leakage current circuit breaker for connecting to a phase conductor and a neutral conductor, is formed from the first and the second housing module. If one or two further housing modules are added, a three-pole or four-pole modular rail-mounted device, for example a three-pole or four-pole earth leakage current circuit breaker for connecting to two or three phase conductors and one neutral conductor, is formed in this manner. Because of the additional number of poles, only the plug-in summation current transformer module has to correspondingly be equipped with a plurality of primary conductors. In this way, the rail-mounted device is upgradeable in a modular manner without great complexity and without any associated significant increase in terms of the diversity of components, as a result of which the complexity in terms of production, warehousing and logistics can be significantly reduced.

In one advantageous refinement of the multi-pole rail-mounted device in modular form, the terminal contacts are configured to be fork-shaped.

The fork-shaped terminal contacts have the advantage that the first and the second primary conductor ends when being brought into their respective joining position are positioned between the prongs of the fork-shaped ends of the terminal contacts, as a result of which the subsequent joining procedure, that is to say the establishment of an electrically conducting connection between the respective primary conductor end and the terminal contact respectively assigned thereto is significantly simplified.

The method according to the invention for assembling a plug-in summation current transformer module of the type described above in a module-overlapping installation space of a multi-pole insulating-material housing in modular form of a multi-pole rail-mounted device in modular form of the type described above comprises the following steps:

a) fixing the first and the second primary conductor ends in their respective assembling position with the aid of the primary conductor holder;
b) inserting the plug-in summation current transformer module in a first direction into the module-overlapping installation space;
c) releasing the primary conductor holder, wherein the primary conductor ends are moved in a second direction, running transversely to the first direction, into their respective joining position.

In terms of the fundamental advantages of the assembly method according to the invention, reference is made to the statements above pertaining to the advantages of the plug-in summation current transformer module according to the invention as well as of the multi-pole rail-mounted device in modular form according to the invention. Moreover, the assembly method according to the invention has the advantage that, by moving the primary conductor holder from its fixing position to the releasing position, the primary conductor ends by a movement in the second direction are moved into their respective joining position from their respective assembling position which said primary conductor ends assume during the insertion of the plug-in summation current transformer module in the first direction into their respective joining position in which said primary conductor ends are positioned in direct proximity of the terminal contact respectively assigned to the respective primary conductor end. As a result, the assembly procedure is significantly simplified and can be carried out manually as well as in an automated manner.

Other features which are considered as characteristic for the invention are set forth in the appended claims.

Although the invention is illustrated and described herein as embodied in a plug-in summation current transformer module, a rail-mounted device, and an assembly method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
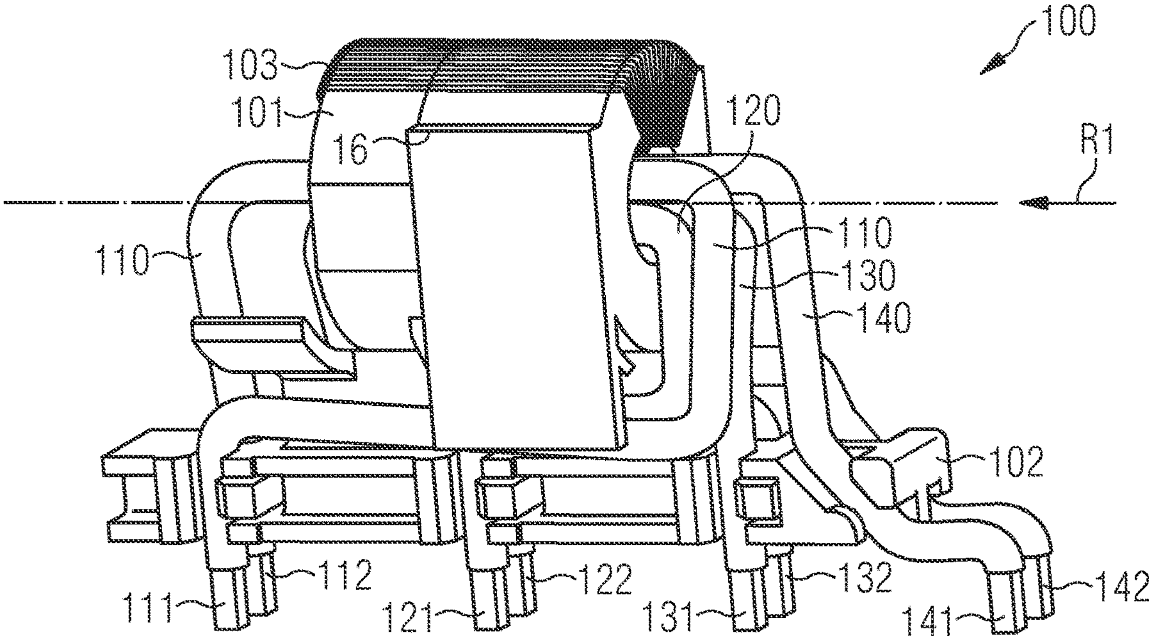
FIG. 1 shows a schematic illustration of the plug-in summation current transformer module according to the invention in a perspective view.

Identical and functionally equivalent parts and elements are provided with the same reference sign throughout the figures. The description applies to all of the figures of the drawing in which the corresponding part can likewise be seen.

DETAILED DESCRIPTION OF THE INVENTION

Referring now to the figures of the drawing in detail and first, in particular, to the schematic perspective view of FIG. 1, there is shown a plug-in summation current transformer module 100 according to the invention. The plug-in summation current transformer module 100 is provided for assembling in a four-pole modular rail-mounted device (see FIGS. 3 to 8) and has a tubular summation current transformer 101 which is composed of a magnetic core (not explicitly illustrated) which for protection against damage is received in a tubular housing that extends in a first direction R1. A guide contour 16 is configured on the housing of the summation current transformer 101. The summation current transformer 101 furthermore has a secondary winding 103 which at least in portions is wound about the magnetic core housing.

The plug-in summation current transformer module 100 has four primary conductors, i.e., a first primary conductor

110 having a first primary conductor end 111 and a second primary conductor end 112, a second primary conductor 120 having a first primary conductor end 121 and a second primary conductor end 122, a third primary conductor 130 having a first primary conductor end 131 and a second primary conductor end 132, as well as a fourth primary conductor 140 having a first primary conductor end 141 and a second primary conductor end 142. The primary conductors are routed through the opening of the tubular housing of the summation current transformer 101.

The plug-in summation current transformer module 100 has a primary conductor holder 102 which is mechanically connected to the housing of the summation current transformer 101. The primary conductor holder is movable between a fixing position and a releasing position and serves to fix the first and the second primary conductor ends 111, 112, 121, 122, 131, 132, 141 and 142 in the fixing position such that this results in a compact arrangement of the first and of the second primary conductor ends 111, 112, 121, 122, 131, 132, 141 and 142 below the summation current transformer, this being the so-called assembling position.

Figure 2:
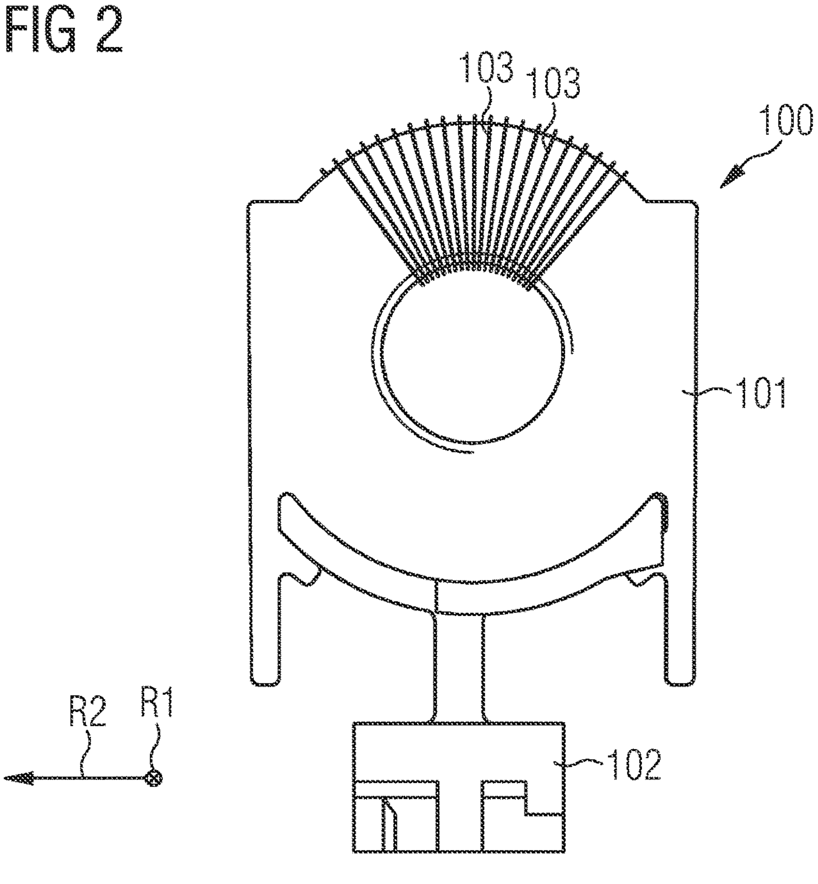
FIG. 2 shows a schematic detailed illustration of the summation current transformer having the primary conductor holder fastened thereto.

FIG. 2 shows a detailed illustration of the summation current transformer 101 having the primary conductor holder 102 fastened thereto, in a frontal view in the direction of the first direction R1. To be readily seen in this illustration is inter alia the fastening of the primary conductor holder 102 to the housing of the summation current transformer 101. The fastening in the illustrated case is implemented in a form-fitting manner by means of a plug-in connection. The specific connection is not relevant to the invention; other connection types, including even the integral molding of the primary conductor holder 102 on the housing of the summation current transformer 101, are likewise conceivable here.

FIG. 2 as well as FIG. 1 show in each case the primary conductor holder 102 in its fixing position in which the primary conductor ends 111, 112, 121, 122, 131, 132, 141 and 142 are held and fixed in a compact manner below the summation current transformer 101 such that said primary conductor ends 111, 112, 121, 122, 131, 132, 141 and 142 are held so as to be as compact as possible in a second direction R2, oriented transversely to the first direction R1, i.e., occupy as little space as possible.

Figure 3:
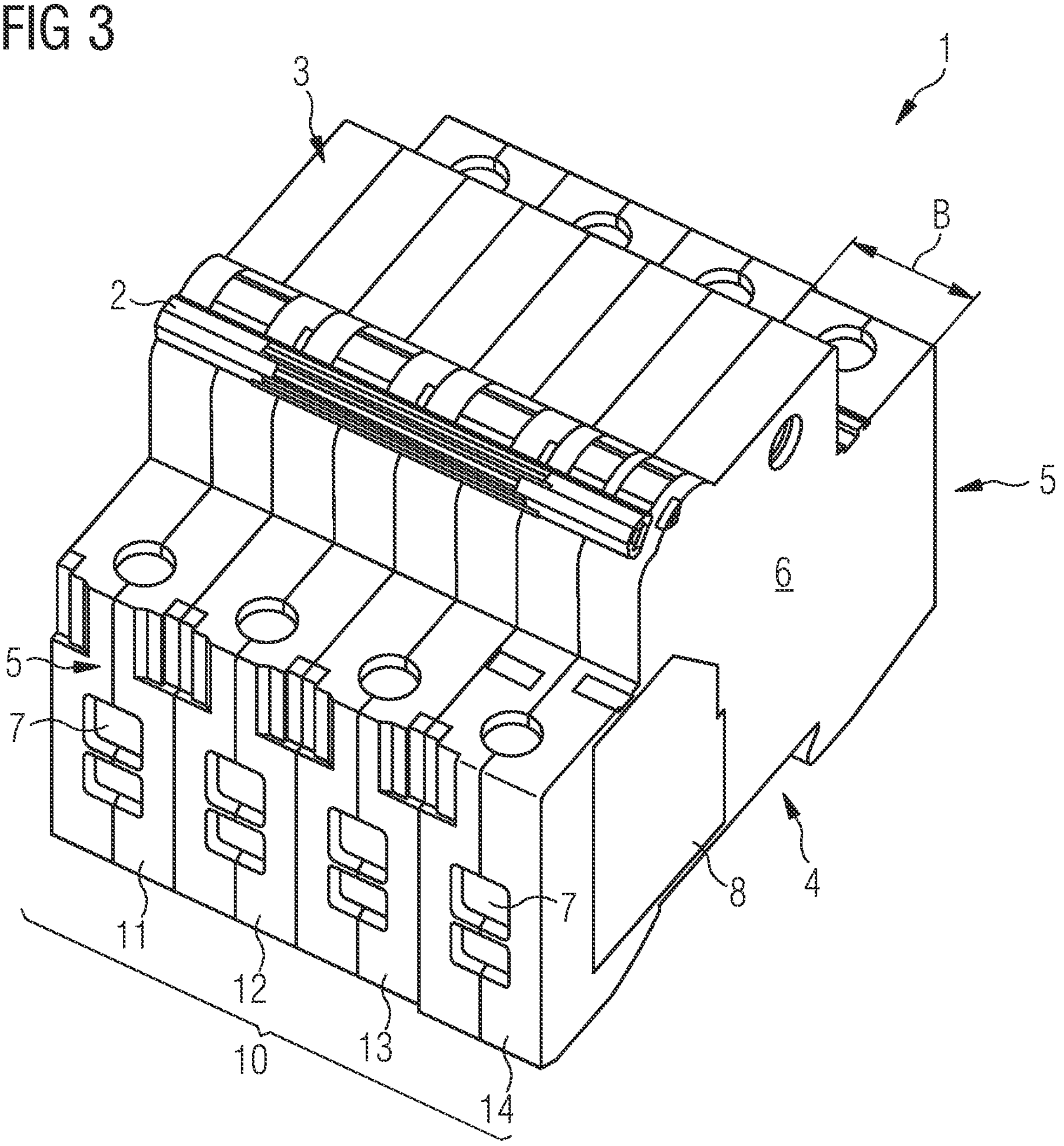
FIGS. 3 and 4 show schematic illustrations of the multi-pole rail-mounted device according to the invention formed from a plurality of housing modules, without the plug-in summation current transformer module.
Figure 4:
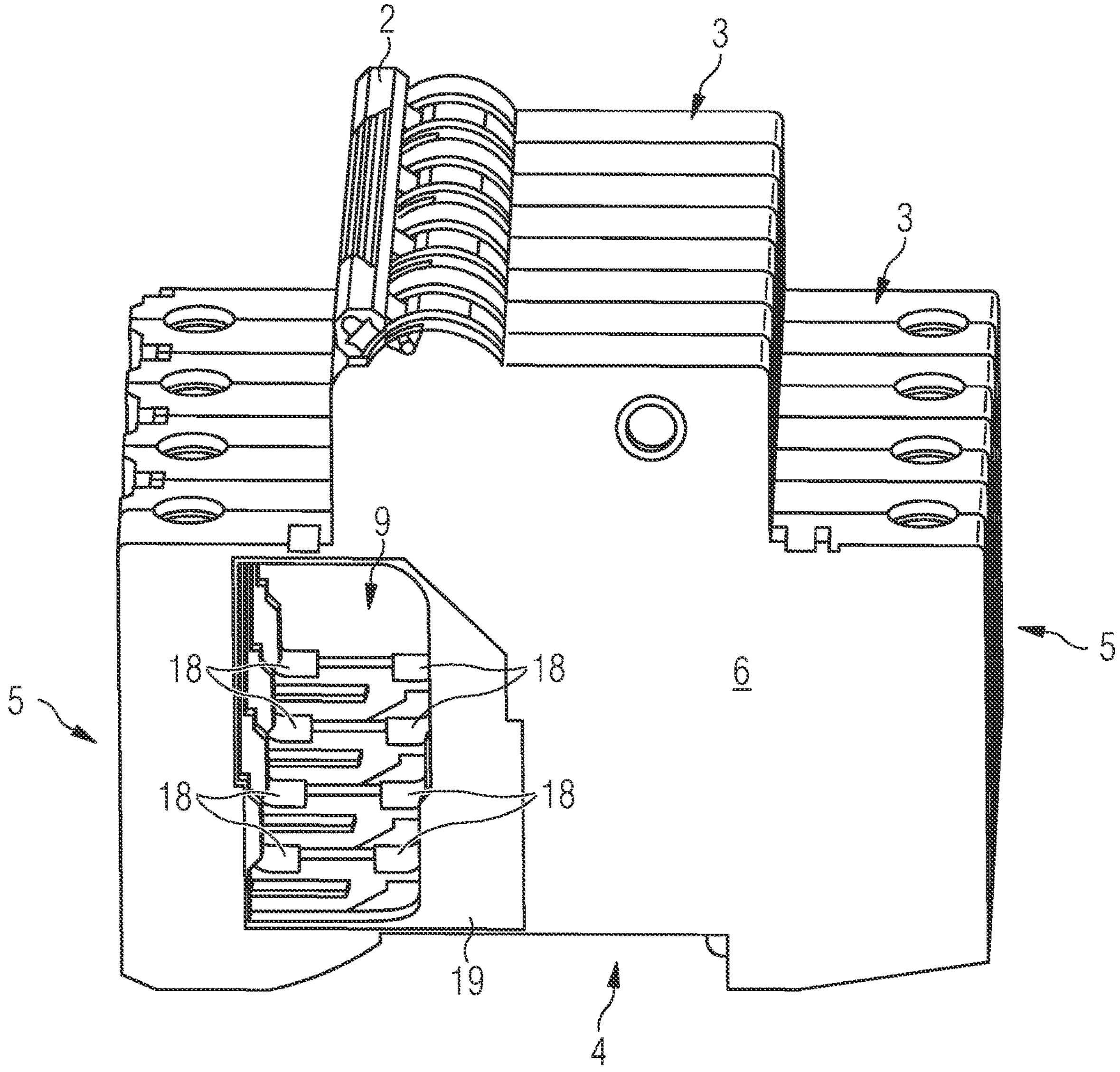

FIGS. 3 and 4 schematically show the multi-pole rail-mounted device 1 according to the invention, formed from a plurality of housing modules, without the plug-in summation current transformer module 100. The multi-pole rail-mounted device 1 illustrated in FIGS. 3 and 4 is configured as a four-pole RCBO and has an insulating-material housing 10 which is formed from a first housing module 11, a second housing module 12, a third housing module 13, and a fourth housing module 14. The fourth housing module 14 here is configured as a RCD module (illustrated on the right in FIG. 3), i.e., it is populated with the components that are typical of a fault current circuit breaker and is provided for contacting the neutral conductor, while the first three housing modules 11, 12 and 13 are configured as MCB modules and are accordingly populated with the components typical of a line circuit breaker. Accordingly, the three MCB modules 11, 12 and 13 are in each case provided for contacting in each case a phase conductor of a three-phase power distribution system that is unequivocally assigned to this module.

Each of the four housing modules 11, 12, 13 and 14 is embodied in a slimline construction mode and has a width B of one pitch unit (a pitch unit corresponds to approx. 18 mm), whereby the envelope areas that define the external dimensions are formed by a front side 3, a fastening side 4 opposite the front side, as well as narrow sides 5 and wide sides 6 which connect the front side 3 and the fastening side 4. Screw clamps 7 for contacting grid-proximal or load-proximal connecting conductors, i.e., phase conductors or neutral conductors (not illustrated), are in each case received and mounted in the region of the narrow sides 5 in the respective housing module 11, 12, 13, 14. For manual activation, each of the housing modules 11, 12, 13, 14 has an activating element which is disposed in the region of the front side 11 of said housing modules 11, 12, 13, 14, wherein the individual activating elements are connected for collective activation with the aid of a handle element 2 that connects the individual activating elements.

Insulating-material housings in a slimline construction mode typically have two half-shells which in the final stage of assembling of the low-voltage circuit breaker device 1 are joined together by means of suitable connecting means, for example rivet connections or latching connections, while forming an encircling joint line. Each of the half-shells here includes one of the wide sides 6 as well as parts of the (full or complete) front, fastening and narrow sides 3, 4, 5. The housing modules 11, 12, 13 and 14 are also embodied in a slimline construction mode, which housing modules 11, 12, 13 and 14 during assembling are first completely populated and individually closed before the individual housing modules 11, 12, 13 and 14 are connected so as to form the mechanically structurally stable insulating-material housing 10 of the multi-pole rail-mounted device 1 in modular form.

Configured in the wide sides 6 of each of the housing modules 11, 12, 13, 14 is an opening 19 which extends orthogonally to the wide sides 6, from one wide side 6 of the respective housing module 11, 12, 13, 14 to the other wide side 6. Two electrical terminal contacts 18 of the respective housing module 11, 12, 13, 14 protrude laterally into the respective opening of the respective housing module 11, 12, 13, 14, in order to be connected in an electrically conducting manner to a first or second end 111, 112, 121, 122, 131, 132, 141, 142 of the respectively unequivocally assigned primary conductor 110, 120, 130, 140 that is unequivocally assigned to the respective terminal contact 18. By connecting the housing modules 11, 12, 13, 14 so as to form the mechanically structurally stable insulating-material housing 10 of a multi-pole rail-mounted device 1 in modular form, a module-overlapping installation space 9, in which the voluminous plug-in summation current transformer module 100 is disposed, i.e., received and mounted, is created from the plurality of openings 19 of the individual housing modules 11, 12, 13, 14. The module-overlapping installation space 9 here is accessible by way of each of the two wide sides 6 of the insulating-material housing 10 formed in such a manner, and is able to be closed by means of suitable closure elements, for example with the aid of a cover 8 (see, FIG. 3), for protection against environmental influences such as dust or moisture.

Figure 5:
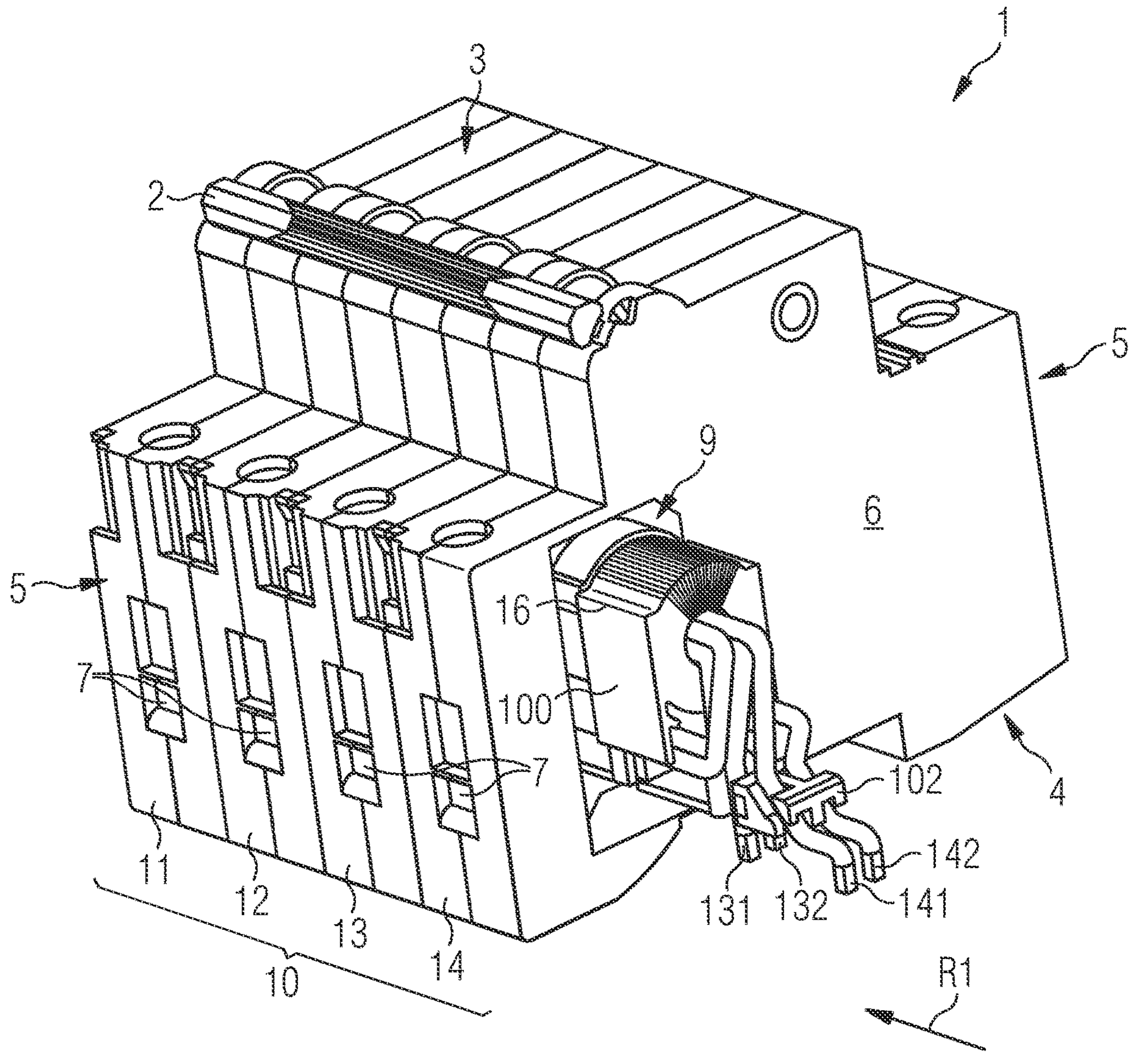
FIG. 5 shows a schematic illustration of the rail-mounted device according to the invention from FIGS. 3 and 4 during insertion of the plug-in summation current transformer module.

FIG. 5 shows a schematic illustration of the modular rail-mounted device 1 according to the invention, which is known from FIGS. 3 and 4, during insertion of the plug-in summation current transformer module 100 in the first direction R1 into the module-overlapping installation space 9. The module-overlapping installation space 9 here is formed by the openings 19 which are configured in the individual housing modules 11, 12, 13 and 14, as described above. In order for the first and the second ends 111, 112, 121, 122, 131, 132, 141, 142 not to collide with the terminal contacts 18 which protrude into the module-overlapping installation space 9 when the plug-in summation current transformer module 100 is being inserted in the first direction R1, said first and second ends 111, 112, 121, 122, 131, 132, 141, 142 are fixed in a compact position below the summation current transformer 101 by the primary conductor holder 102 during insertion in the first direction R1. The spacing of the first and of the second ends 111, 112, 121, 122, 131, 132, 141, 142 of each primary conductor 110, 120, 130, 140 here is slightly smaller than the spacing of the two terminal contacts 18 which are disposed so as to lie opposite one another within a housing module 11, 12, 13, 14.

Figure 6:
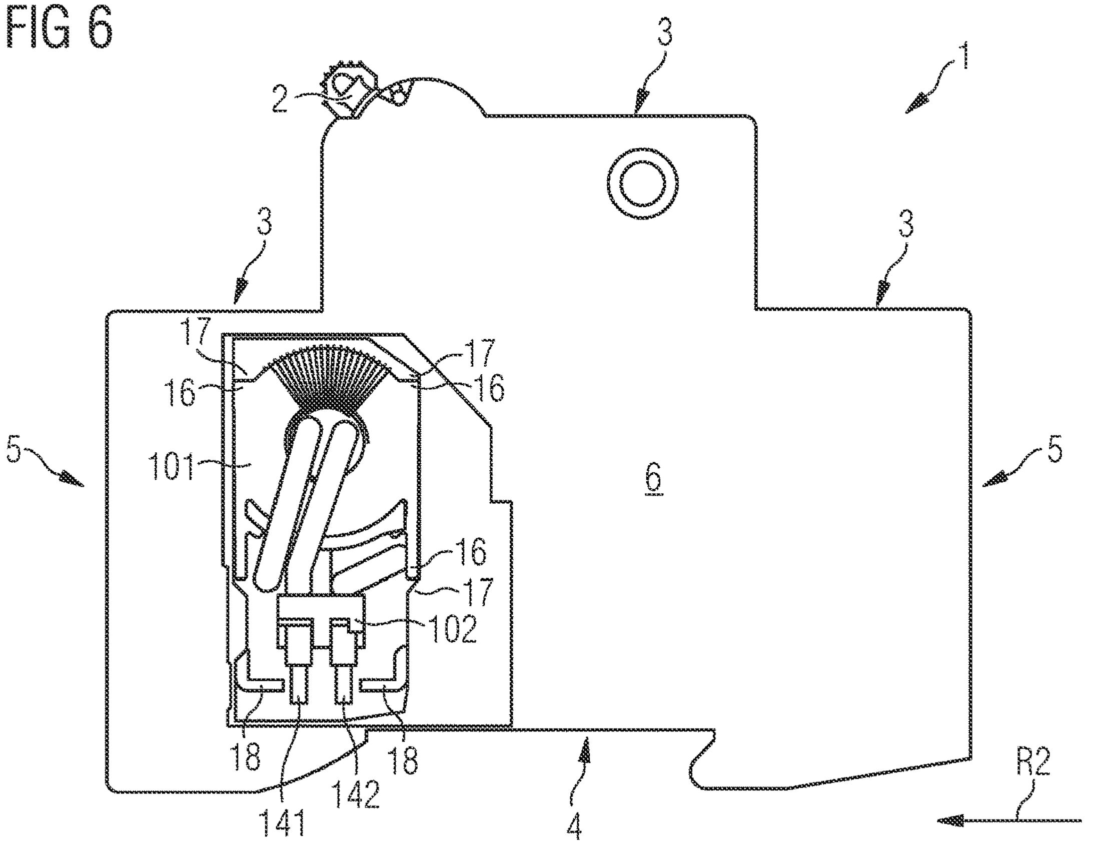
FIGS. 6 to 9 show schematic detailed illustrations of the plug-in summation current transformer module inserted into the rail-mounted device, in various states of assembly.
Figure 7:
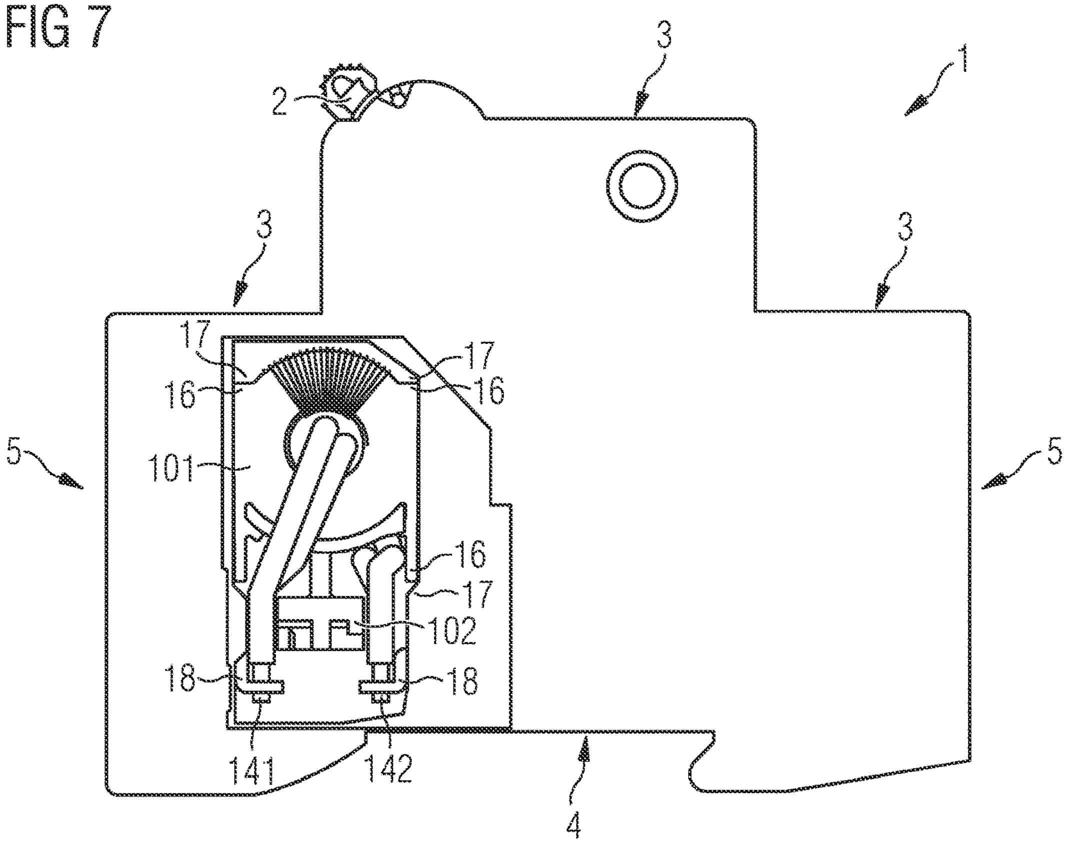

FIGS. 6 to 9 show schematic detailed illustrations of the plug-in summation current transformer module 100 inserted into the modular, multi-pole rail-mounted device 1 formed from a plurality of housing modules 11, 12, 13, 14. FIGS. 6 and 7 here show a lateral view of the front wide side 6 once the plug-in summation current transformer module 100 has been inserted completely into the insulating-material housing 10 of the modular, multi-pole rail-mounted device 1. FIG. 6 here shows a first state of assembly in which the primary conductor holder 102 is still situated in its fixing position, so that the first and the second ends 111, 112, 121, 122, 131, 132, 141, 142 of the primary conductors 110, 120, 130, 140 still assume the compact position, i.e., the assembling position, centrically below the summation current transformer 101, which is required for the insertion into the module-overlapping installation space 9.

A second state of assembly in which the primary conductor holder 102 has been moved into its releasing position is illustrated in FIG. 7. This transition from the fixing position to the releasing position in the case of a multiple-part primary conductor holder 102 can take place by a displacing movement of the two parts of the primary conductor holder 102 relative to one another, for example, by way of which the first and the second ends 111, 112, 121, 122, 131, 132, 141, 142 are forced from their assembling position centrically below the summation current transformer 101 to their joining position. Alternatively, the transition from the fixing position to the releasing position can also be implemented by one or a plurality of snap-fit connections on the primary conductor holder 102. An integral design of the primary conductor holder 102 would also be possible here. Likewise, the first and the second ends 111, 112, 121, 122, 131, 132, 141, 142 either can be forced from their assembling position into the joining position by the primary conductor holder 102, or the first and the second ends 111, 112, 121, 122, 131, 132, 141, 142 have been mounted under tension in the fixing position, and are merely released while transitioning to the releasing position, so that said ends 111, 112, 121, 122, 131, 132, 141, 142 move to their respective joining position by virtue of their inherent elasticity.

In the joining position, each of the first and of the second primary conductor ends 111, 112, 121, 122, 131, 132, 141, 142 is situated in direct proximity of the terminal contact 18 unequivocally assigned thereto, so that the primary conductor ends 111, 112, 121, 122, 131, 132, 141, 142 can be easily connected to the terminal contact 18 respectively assigned thereto in an electrically conducting manner by a suitable joining method. Furthermore, the guide contours 16, which are configured on the plug-in summation current transformer module 100 and for insertion with an exact fit into the module-overlapping installation space 9 interact with guide contours 17 configured thereon, can be readily seen in FIGS. 6 and 7.

Figure 8:
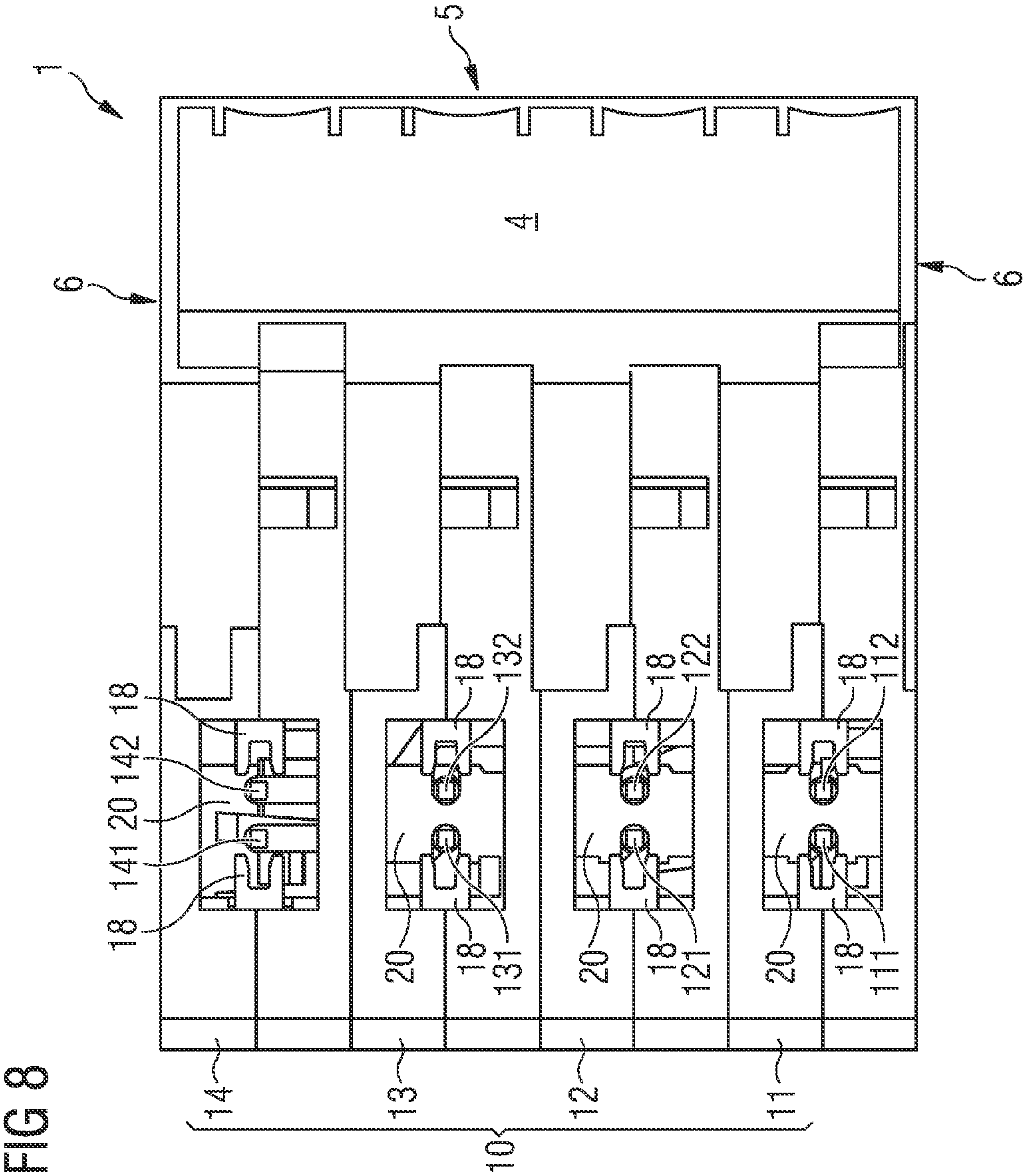

A view of the fastening side 6 of the modular, multi-pole rail-mounted device 1 formed from a plurality of housing modules 11, 12, 13, 14, having the plug-in summation current transformer module 100 inserted into the module-overlapping installation space 9, is schematically illustrated in FIG. 8.

Each of the housing modules 11, 12, 13, 14 has a further opening 20 which is configured in the fastening side 4 and is disposed below the opening 19 arranged to the respective housing module 11, 12, 13, 14 and reaches into said opening 19. The further openings 20 may be closed with individual covers or a common cover (not illustrated). Since the primary conductor holder 102 is still situated in its fixing position, the first and the second ends 111, 112, 121, 122, 131, 132, 141, 142 of the primary conductors 110, 120, 130 and 140 are still situated in their respective assembling position. By moving the primary conductor holder 102 into its releasing position, the first and the second ends 111, 112, 121, 122, 131, 132, 141, 142 are brought to their respective joining position so as to be connected in an electrically conducting manner to the respective terminal contact 18 unequivocally assigned thereto.

Figure 9:
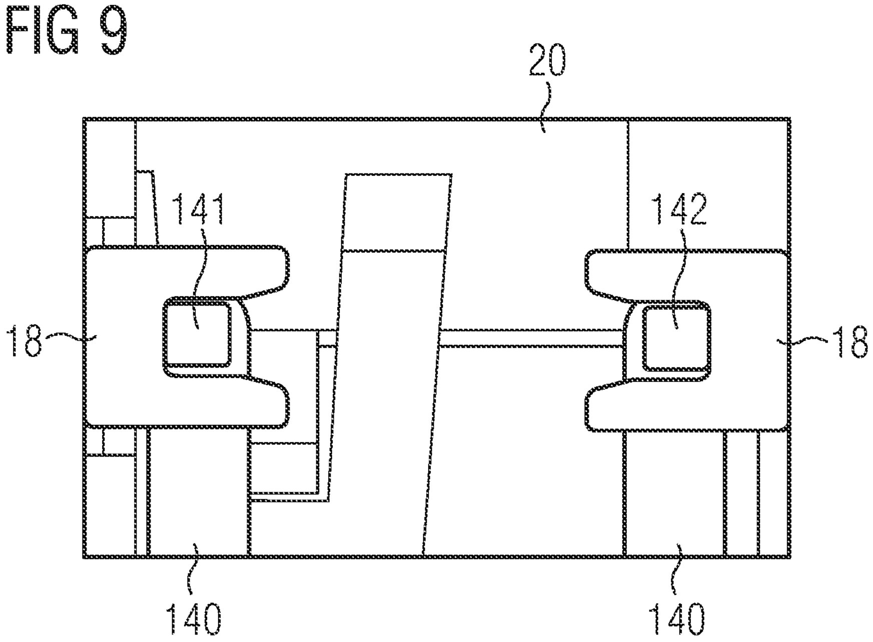

For this purpose, FIG. 9 shows a detailed illustration in which the two ends 141, 142 of the fourth primary conductor 140 are situated in their respective joining position. The terminal contacts 18 are configured to be fork-shaped, as a result of which the joining is significantly facilitated. The joining method employed for establishing the electrically conducting connection, for example soldering/brazing, welding or crimping, can be carried out in a simple manner here, by way of the openings 20 configured in the fastening side 4.

Figure 10:
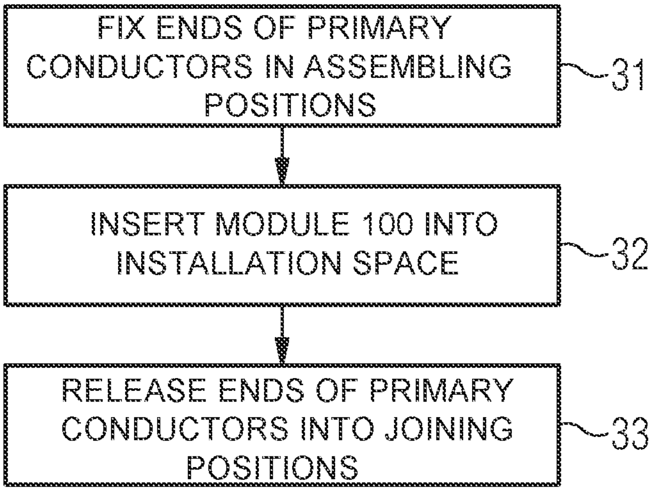
FIG. 10 shows a schematic illustration of the assembly method according to the invention.

The method according to the invention for assembling the plug-in summation current transformer module 100 according to the invention in the module-overlapping installation space 9 of the multi-pole insulating-material housing 10 in modular form of the multi-pole rail-mounted device 1 according to the invention in modular form is schematically illustrated in FIG. 10.

In a first step 31 in the method, the first and the second ends 111, 112, 121, 122, 131, 132, 141, 142 of the primary conductors 110, 120, 130, 140 are fixed in their respective assembling positions with the aid of the primary conductor holder 102. This step thus represents the pre-assembling of the plug-in summation current transformer module 100.

In a second step 32, the plug-in summation current transformer module 100 is inserted in the first direction R1 into the module-overlapping installation space 9 of the multi-pole rail-mounted device 1 of modular form. In the process, the first and the second ends 111, 112, 121, 122, 131, 132, 141, 142 are held in a compact manner below the summation current transformer 101, as a result of which any collision with the terminal contacts 18 protruding into the module-overlapping installation space 9 is avoided.

In a third step 33, the fixing of the first and of the second ends 111, 112, 121, 122, 131, 132, 141, 142 by the primary conductor holder 102 is released in that the latter is moved from its fixing position into its releasing position, as a result of which the first and the second ends 111, 112, 121, 122, 131, 132, 141, 142 are moved in a second direction R2, running transversely to the first direction R1, from their respective assembling position into their respective joining position.

The assembling procedure is significantly simplified with the aid of the assembly method according to the invention. The assembly can be carried out manually as well as in a (partially) automated manner.

The following is a summary list of reference numerals and the corresponding structure used in the above description of the invention:

1 Rail-mounted device
2 Handle element
3 Front side
4 Fastening side
5 Narrow side
6 Wide side
7 Screw clamp
8 Cover
9 Module-overlapping installation space
10 Insulating-material housing
11 First housing module
12 Second housing module
13 Third housing module
14 Fourth housing module
16 Guide contour
17 Guide contour
18 Terminal contact
19 Opening
20 Further opening
31 First method step
32 Second method step
33 Third method step
100 Plug-in summation current transformer module
101 Summation current transformer
102 Primary conductor holder
103 Secondary winding
110 First primary conductor
111 First primary conductor end
112 Second primary conductor end
120 Second primary conductor
121 First primary conductor end
122 Second primary conductor end
130 First primary conductor
131 First primary conductor end
132 Second primary conductor end
140 First primary conductor
141 First primary conductor end
142 Second primary conductor end
B Width
R1 First direction
R2 Second direction

The invention claimed is:

1. A plug-in summation current transformer module for insertion into a module-overlapping installation space of a multi-pole rail-mounted device formed from a plurality of housing modules, the current transformer module comprising:

a tubular summation current transformer;

at least one first primary conductor and at least one second primary conductor, each being routed through said tubular summation current transformer and each having a first primary conductor end and a second primary conductor end;

a primary conductor holder for fixing said first and second primary conductor ends, said primary conductor holder being fastened to said summation current transformer and being configured to adopt a fixing position and a releasing position, said primary conductor holder being configured, in the fixing position, to hold said first and second primary conductor ends in a respective assembling position during an insertion into the module-overlapping installation space; and after insertion, by moving to the releasing position, to bring said first and second primary conductor ends into a respective joining position.

2. The plug-in summation current transformer module according to claim 1, wherein said first and second primary conductor ends in the assembling position project radially from said tubular summation current transformer.

3. The plug-in summation current transformer module according to claim 1, having a guide contour which is configured, during insertion into the module-overlapping installation space, to interact with a guide contour in the module-overlapping installation space, so as to enable a collision-free insertion into the module-overlapping installation space.

4. The plug-in summation current transformer module according to claim 1, wherein said first and second primary conductor ends, in the assembling positions thereof, are to be fixed relative to an inherent elasticity of said first and second primary conductors.

5. The plug-in summation current transformer module according to claim 1, wherein said primary conductor holder comprises a snap-fit connection which, when released, causes a transition from the fixing position to the releasing position.

6. The plug-in summation current transformer module according to claim 1, wherein at least one further primary conductor is routed through said summation current transformer.

7. A modular multi-pole rail-mounted device, comprising:

at least two housing modules, each having a front side, a fastening side opposite said front side, first and second narrow sides, and first and second wide sides connecting said front and fastening sides;

each of said housing modules being formed with an opening running between said first and second wide sides and wherein, when said at least two housing modules are connected to one another to form an insulating-material housing with a module-overlapping installation space, and wherein two terminal contacts protrude into the respective opening in each of said housing modules;

a plug-in summation current transformer module according to claim 1 with the first and second primary conductor ends, in their respective joining positions, being disposed directly adjacent respectively assigned terminal contacts.

8. The modular multi-pole rail-mounted device according to claim 7, wherein said terminal contacts are fork-shaped terminal contacts.

9. A method of assembling a modular multi-pole rail-mounted device, the method comprising:

providing a plug-in summation current transformer module according to claim 1;

providing a multi-pole insulating material housing formed of at least two housing modules, each having a front side, a fastening side opposite the front side, first and second narrow sides, first and second wide sides connecting said front and fastening sides, and an opening in each of the housing modules which, when the at least two housing modules are connected to one another, form a module-overlapping installation space with two terminal contacts protruding into the respective opening in each of the housing modules;

fixing the first and the second primary conductor ends in their respective assembling position with the aid of the primary conductor holder;

inserting the plug-in summation current transformer module in a first direction into the module-overlapping installation space; and releasing the primary conductor holder to move the primary conductor ends in a second direction, running transversely to the first direction, into their respective joining position.

* * * * *